United States Patent
Miyake et al.

(10) Patent No.: US 10,809,558 B2
(45) Date of Patent: Oct. 20, 2020

(54) VEHICLE DISPLAY DEVICE

(71) Applicant: Yazaki Corporation, Tokyo (JP)

(72) Inventors: Yuta Miyake, Shizuoka (JP); Kenji Yagi, Shizuoka (JP); Naohisa Murata, Shizuoka (JP); Hidetoshi Mukojima, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/407,164

(22) Filed: May 8, 2019

(65) Prior Publication Data

US 2019/0346713 A1 Nov. 14, 2019

(30) Foreign Application Priority Data

May 11, 2018 (JP) .................................. 2018-091933
Oct. 23, 2018 (JP) .................................. 2018-199387
Mar. 5, 2019 (JP) .................................. 2019-039855

(51) Int. Cl.
*G02F 1/1333* (2006.01)
*G02B 27/01* (2006.01)

(52) U.S. Cl.
CPC ... *G02F 1/133382* (2013.01); *G02B 27/0101* (2013.01); *G02B 27/0149* (2013.01)

(58) Field of Classification Search
CPC ............ G02B 27/0179; G02B 27/0101; G02B 27/0149; G02F 1/133382
USPC .......................................................... 349/72
See application file for complete search history.

(56) References Cited

U.S. PATENT DOCUMENTS

| | | | |
|---|---|---|---|
| 2011/0102483 A1* | 5/2011 | Kanamori | G09G 3/002 345/690 |
| 2015/0092118 A1* | 4/2015 | Hada | G02B 26/0833 349/11 |
| 2015/0098029 A1 | 4/2015 | Sato et al. | |
| 2016/0216553 A1 | 7/2016 | Otani | |
| 2019/0011712 A1* | 1/2019 | Nagano | B60K 35/00 |
| 2019/0049729 A1* | 2/2019 | Honma | G02B 27/017 |
| 2020/0039438 A1* | 2/2020 | Umezawa | G02B 27/0179 |

FOREIGN PATENT DOCUMENTS

| | | |
|---|---|---|
| DE | 102014214976 A1 | 2/2016 |
| JP | 2009-192977 A | 8/2009 |
| JP | 2011-247997 A | 12/2011 |
| JP | 2013-228442 A | 11/2013 |

* cited by examiner

*Primary Examiner* — Charles S Chang
(74) *Attorney, Agent, or Firm* — Kenealy Vaidya LLP (57) ABSTRACT

A vehicle display device includes a display that emits a display image projected on a windshield provided outside as display light, two reflective mirrors that are disposed on a light path of the display light from the display to the windshield and reflect the display light, an optical sensor that detects the external light entering from an opening communicating between the outside and an internal space, and a controller configured to execute temperature decreasing operation of the display for decreasing a temperature thereof when the optical sensor detects the external light. The optical sensor is disposed at a position to which external light directed toward the display via the reflective mirror is reflected by the display to be directed.

12 Claims, 9 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2018-091933 filed in Japan on May 11, 2018, Japanese Patent Application No. 2018-199387 filed in Japan on Oct. 23, 2018 and Japanese Patent Application No. 2019-039855 filed in Japan on Mar. 5, 2019.

BACKGROUND OF THE INVENTION

1. Field of the Invention

The present invention relates to a vehicle display device.

2. Description of the Related Art

Conventionally, some vehicles such as automobiles are mounted with a head up display (HUD) device. A head up display device causes a driver to visually recognize a display image displayed on a display as a virtual image by projecting the display image on a windshield or a combiner via a reflective mirror, for example. In a head up display device, when a display image displayed on a display in a housing is projected on, for example, a windshield outside a housing, an opening is provided at a top of the housing. For example, when external light such as sunlight enters from the opening and reaches the display via, for example, a reflective mirror, the display may overheat due to a light condensing action of the reflective mirror, for example.

In a conventional head up display device, a temperature sensor detects a temperature rise of a display due to external light, and when the temperature of the display exceeds a threshold temperature, dimming or turning off of the display, changing of an angle of a reflective mirror, or the like, is executed to suppress a temperature rise of the display. However, since dimming of the display, for example, is executed after the temperature of the display exceeds a threshold temperature, it is difficult to suppress a temperature rise of the display at an appropriate timing. Thus, a technique for suppressing a temperature rise at an appropriate timing by detecting infrared rays contained in external light using an infrared ray sensor is proposed (for example, refer to Japanese Patent Application Laid-open No. 2013-228442).

By the way, in the method for detecting external light by an infrared ray sensor disposed on a back of a reflective mirror, external light with which a display is actually irradiated is not detected. Therefore, irradiation of external light to a display is difficult to be accurately detected, which leaves room for improvement.

SUMMARY OF THE INVENTION

The present invention is made in view of the above problems, and an object thereof is to provide a vehicle display device that accurately detects external light with which a display is irradiated via a reflective mirror and prevent damage of a display due to external light.

In order to achieve the above mentioned object, a vehicle display device according to one aspect of the present invention includes a display that emits, as display light, a display image projected on a projection target provided outside the vehicle display device; at least one reflective mirror that is disposed on a light path of the display light from the display to the projection target and reflects the display light; an optical sensor that detects external light entering from an opening communicating between the outside and an internal space; and a controller configured to execute temperature decreasing operation for decreasing a temperature of the display when the optical sensor detects the external light, wherein at least one of the optical sensor is disposed at a position to which the external light directed toward the display via the reflective mirror is reflected by the display to be directed.

According to another aspect of the present invention, in the vehicle display device, the optical sensor may be disposed on an opposite side of the opening via the display in the internal space.

According to still another aspect of the present invention, the vehicle display device may further include a temperature sensor that detects a temperature of the display, wherein the controller may restrict execution of the temperature decreasing operation when the optical sensor detects the external light and a detected value by the temperature sensor is equal to or less than a threshold value.

According to still another aspect of the present invention, the vehicle display device may further include a temperature sensor that is disposed at least in a vehicle and outside the vehicle display device, wherein the controller may restrict execution of the temperature decreasing operation when the optical sensor detects the external light and a detected value by the temperature sensor is equal to or less than a threshold value.

According to still another aspect of the present invention, in the vehicle display device, the display may include: a transmissive liquid crystal display unit; and a backlight unit that illuminates the liquid crystal display unit from a back side, the backlight unit may be disposed facing the reflective mirror, and the liquid crystal display unit may be disposed inclined toward the optical sensor with respect to an emission direction of light emitted from the backlight unit toward the reflective mirror.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a vehicle display device according to the present invention will be described in detail with reference to the drawings. The present invention is not limited to these embodiments. Constituent elements in the embodiments below include those that can be easily assumed by those skilled in the art or those substantially identical. Further, various types of omissions, substitutions, or changes can be made to the constituent elements in the embodiments described below without departing from the gist of the invention.

First Embodiment

Figure 1:
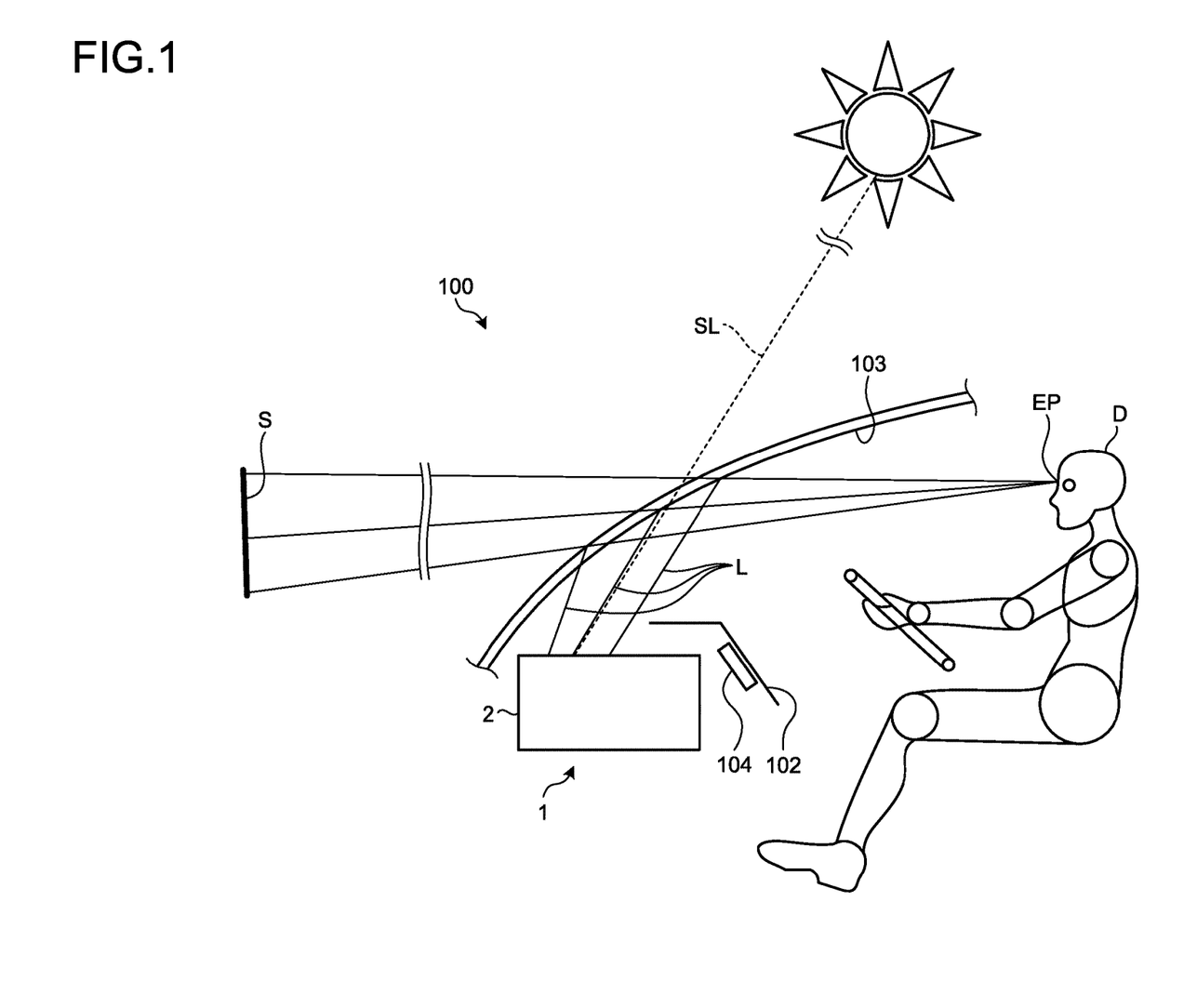
FIG. 1 is a schematic view illustrating a schematic configuration of a vehicle mounted with a vehicle display device according to a first embodiment.
Figure 2:
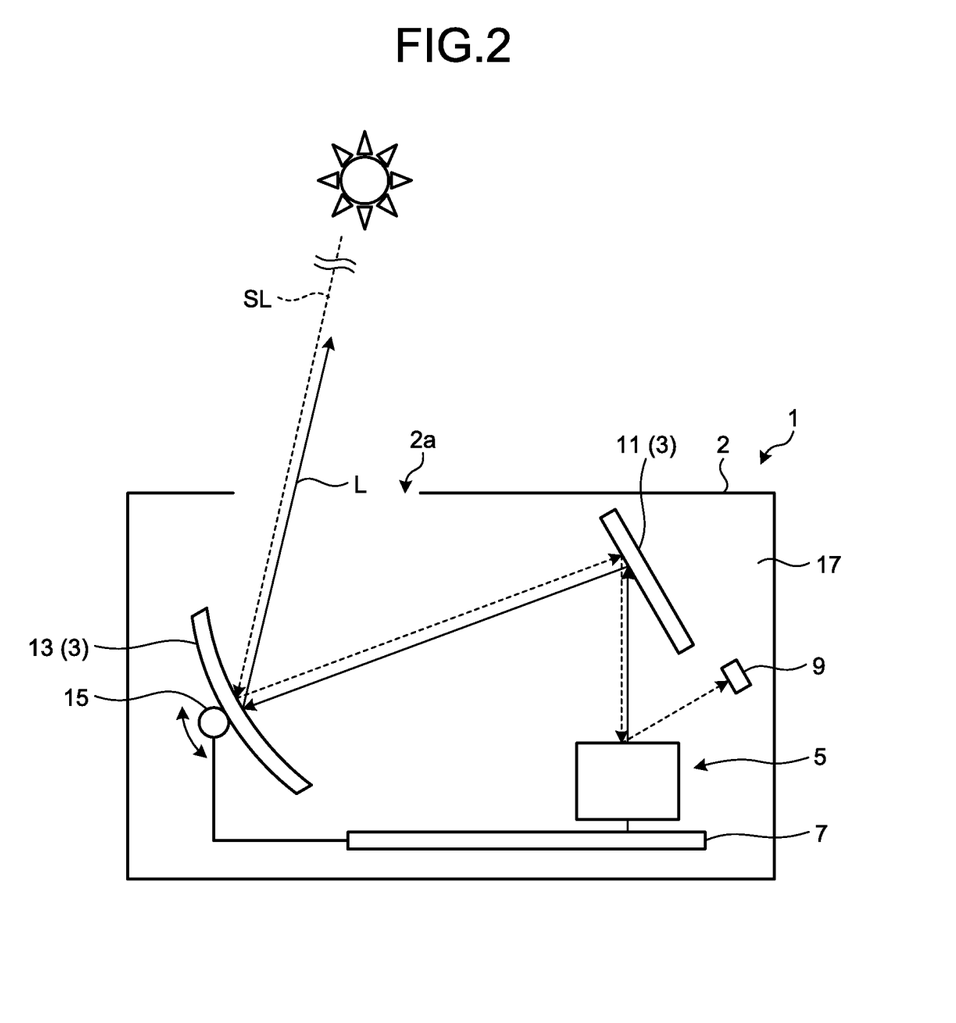
FIG. 2 is a schematic view illustrating a schematic configuration of the vehicle display device according to the first embodiment.
Figure 3:
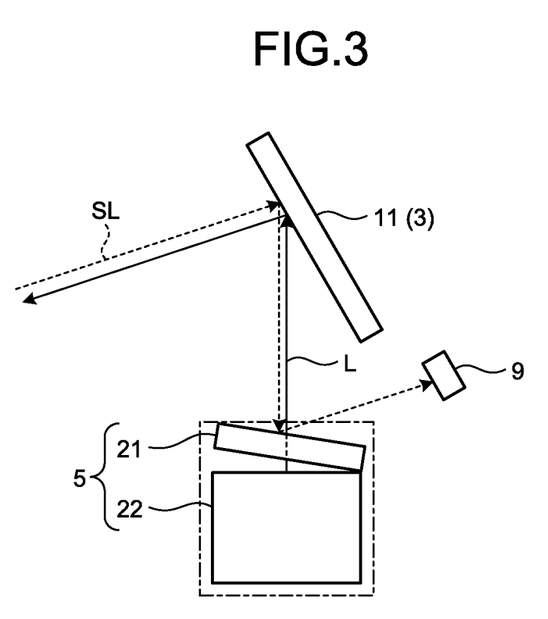
FIG. 3 is a schematic view illustrating a schematic configuration of a display according to the first embodiment.

FIG. 1 is a schematic view illustrating a schematic configuration of a vehicle mounted with a vehicle display device according to a first embodiment. FIG. 2 is a schematic view illustrating a schematic configuration of the vehicle display device according to the first embodiment. FIG. 3 is a schematic view illustrating a schematic configuration of a display according to the first embodiment.

A vehicle display device 1 is, as illustrated in FIG. 1, a head up display device mounted in a vehicle 100 such as an automobile, for example. In the vehicle 100, the vehicle display device 1 is disposed inside an instrument panel 102 together with a meter 104 and projects a display image on a windshield 103. The vehicle display device 1 projects a display image on the windshield 103, as a projection target, and displays a virtual image S in front of an eye point EP of a driver D. With a semi-transmissive property that reflects a part of entering light and transmits the other part, the windshield 103 reflects a display image projected from the vehicle display device 1 toward the eye point EP of the driver D as display light L while transmitting foreground of the vehicle 100. The windshield 103 is provided outside the vehicle display device 1 and disposed, for example, above the instrument panel 102. The eye point EP is assumed in advance as a viewpoint position of the driver D. The driver D recognizes a display image reflected by the windshield 103 as the virtual image S. The virtual image S is recognized to the driver D in front of the windshield 103. The vehicle display device 1 of the present embodiment includes a housing 2, two reflective mirrors 3, a display 5, a controller 7, an optical sensor 9, and a drive unit 15.

The housing 2 is, for example, a box made of a synthetic resin material and has an internal space 17 inside. As illustrated in FIG. 2, the housing 2 houses the display 5, the two reflective mirrors 3, the controller 7, the optical sensor 9, and the drive unit 15 in the internal space 17 and supports them. The housing 2 has an opening 2a communicating between the outside of the vehicle display device 1 and the internal space 17. The opening 2a is provided at a position facing the windshield 103 in the housing 2. The vehicle display device 1 of the present embodiment emits the display light L from the housing 2 toward the windshield 103 via the opening 2a. The display light L is light emitted from the display 5 and reflected by the reflective mirrors 3.

As illustrated in FIG. 2, the two reflective mirrors 3 are disposed on a light path of the display light L from the display 5 to the windshield 103 and are an optical system that reflects the display light L emitted from the display 5 toward the windshield 103. The two reflective mirrors 3 of the present embodiment are a flat mirror 11 and a concave mirror 13. The flat mirror 11 has a reflection surface formed of a flat surface and is disposed at a position facing the display 5. The flat mirror 11 totally reflects the display light L emitted from the display 5 on the reflection surface toward the concave mirror 13. The concave mirror 13 has a reflection surface formed of a concave curved surface (or a convex curved surface) and is disposed at a position facing the flat mirror 11. The concave mirror 13 totally reflects the display light L reflected by the flat mirror 11 toward the windshield 103 via the opening 2a. The concave mirror 13 of the present embodiment has a function as a magnifying mirror. In other words, in order to make a display image represented by the display light L after reflected on the concave mirror 13 relatively large compared with a display image represented by the display light L before reflected on the concave mirror 13, the concave mirror 13 enlarges and reflects the display image. The concave mirror 13 of the present embodiment is rotatably supported by the drive unit 15 and can change a reflection angle of the display light L and external light SL. Here, the external light SL is sunlight that enters the housing 2 via the opening 2a. In the present embodiment, the external light SL is condensed by being reflected by the concave mirror 13 that functions as a magnifying mirror. Therefore, the external light SL directed toward the display 5 via the concave mirror 13 is condensed light.

The display 5 emits a display image projected on the windshield 103 as the display light L. The display 5 includes, as illustrated in FIG. 3, a liquid crystal display unit 21 and a backlight unit 22. The liquid crystal display unit 21 is a so-called liquid crystal panel and is made of a transmissive or a semi-transmissive thin film transistor (TFT) liquid crystal display, for example. By being illuminated from a back side, the liquid crystal display unit 21 causes a display surface on a front side to emit light. The liquid crystal display unit 21 of the present embodiment is disposed inclined toward the optical sensor 9 with respect to an emission direction of light emitted from the backlight unit 22 toward the flat mirror 11. The liquid crystal display unit 21 is disposed inclined with respect to the backlight unit 22. The liquid crystal display unit 21 reflects the external light SL on the display surface. The liquid crystal display unit 21 reflects, for example, the external light SL with a polarizing plate on the front side that constitutes the liquid crystal display unit 21. The backlight unit 22 illuminates the liquid crystal display unit 21 from the back side. The backlight unit 22 is disposed facing the flat mirror 11. The backlight unit 22 is driven by, for example, electric power obtained from a battery (not illustrated) in the vehicle 100.

Figure 9:
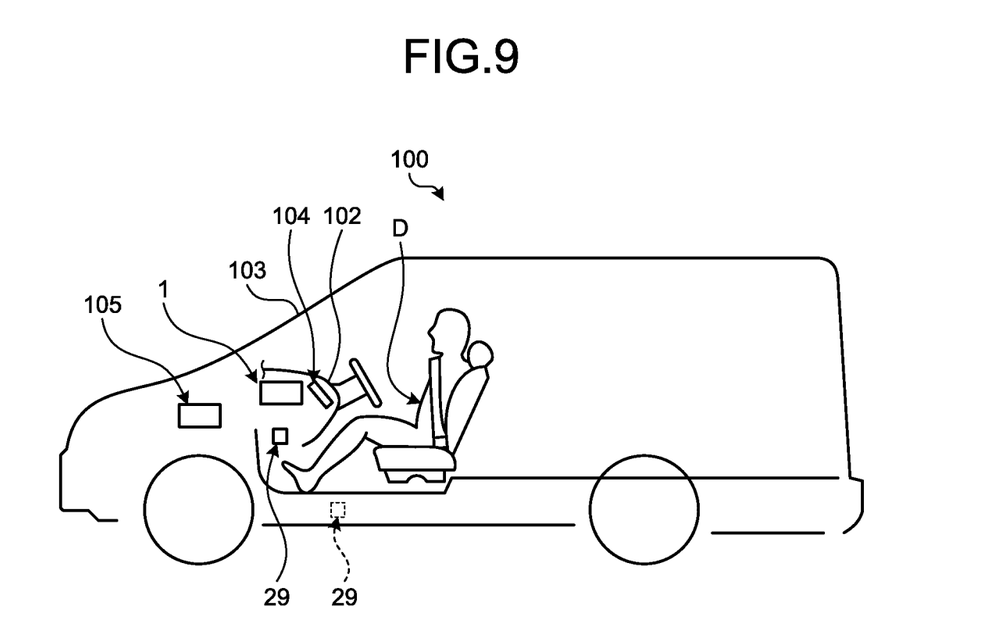
FIG. 9 is a schematic view illustrating a layout example of temperature sensors according to the modification of the second embodiment.

The controller 7 is, as illustrated in FIG. 2, electrically connected to the display 5 and the drive unit 15 to control operation thereof. When the optical sensor 9 detects the external light SL, the controller 7 of the present embodiment executes temperature decreasing operation for decreasing a temperature of the display 5. Here, the temperature decreasing operation includes, for example, dimming or turning-off of the display 5. Specifically, when the optical sensor 9 detects the external light SL, the controller 7 transmits a dimming signal or a turning-off signal to the display 5 and dims or turns off the display 5 (first temperature decreasing operation). The temperature decreasing operation of the present embodiment includes, for example, a change in reflection angle of the reflective mirrors 3. Specifically, when the optical sensor 9 detects the external light SL, the controller 7 transmits a drive signal to the drive unit 15 and changes a reflection angle of the concave mirror 13 by the drive unit 15 (second temperature decreasing operation). When the optical sensor 9 detects the external light SL, the controller 7 controls the display 5 and the drive unit 15 to execute one of the first temperature decreasing operation and the second temperature decreasing operation. The controller 7 is formed of, for example, an IC chip and driven by electric power obtained from a battery in the vehicle 100. The controller 7 may be electrically connected to an electronic control unit (ECU) 105 in the vehicle 100 to exchange signals with the ECU 105 (FIG. 9).

The optical sensor 9 detects the external light SL entering from the opening 2a of the housing 2. The optical sensor 9 is disposed at a position to which the external light SL directed toward the display 5 via the two reflective mirrors 3, of the external light SL entering from the opening 2a of the housing 2, is reflected by the display 5 to be directed. Specifically, the optical sensor 9 is disposed on an opposite side of the opening 2a via the display 5 in the internal space 17. The optical sensor 9 is, for example, an infrared ray sensor and detects light (infrared rays) in an infrared region of the external light SL. Specifically, the optical sensor 9 receives light (infrared rays) in the infrared region of the external light SL to convert the light into an electric signal and outputs the electric signal to the controller 7 as a detection signal.

The drive unit 15 has, for example, a structure in which a motor and a gear are combined and changes the reflection angle of the concave mirror 13. The drive unit 15 is electrically connected to the controller 7 and driven according to a drive signal from the controller 7. The drive unit 15 has, for example, a structure in which a gear attached to a rotating shaft of the motor and a plurality of teeth provided on an opposite side of the reflection surface of the concave mirror 13 mesh with one another. When the drive unit 15 receives a drive signal from the controller 7, the rotating shaft of the motor rotates, and power of the motor is transmitted to the concave mirror 13 by meshing the gear on the motor side with the teeth on a side of the concave mirror 13 to rotate the concave mirror 13 and change the reflection angle of the concave mirror 13.

Next, display operation in the vehicle display device 1 will be described with reference to FIGS. 1 to 3. First, the display light L emitted from the display 5 is directed toward the flat mirror 11. The flat mirror 11 reflects the display light L entering from the display 5 toward the concave mirror 13. The concave mirror 13 reflects the display light L entering from the flat mirror 11 toward the windshield 103 via the opening 2a by the concave reflection surface. As a result, a display image corresponding to the display light L is projected on the windshield 103, and a virtual image S is displayed in front of the eye point EP of the driver D.

Next, the temperature decreasing operation in the vehicle display device 1 will be described with reference to FIGS. 1 to 3. First, the external light SL entering from the opening 2a is partially or entirely reflected by the concave mirror 13 toward the flat mirror 11. The flat mirror 11 reflects a part or all of the external light SL from the concave mirror 13 toward the display 5. The external light SL directed from the flat mirror 11 toward the display 5 is reflected on the display surface of the liquid crystal display unit 21 to be directed toward the optical sensor 9. When detecting infrared rays based on the received external light SL, the optical sensor 9 outputs a detection signal to the controller 7. When receiving the detection signal from the optical sensor 9, the controller 7 transmits a dimming signal or a turning-off signal to the display 5. The display 5 dims the backlight unit 22 when receiving a dimming signal from the controller 7 but turns off the backlight unit 22 when receiving a turning-off signal from the controller 7. The external light SL directed toward the display 5 via the reflective mirrors 3 including the concave mirror 13 is condensed by the concave mirror 13. Therefore, when the display 5 is irradiated with the external light SL, a temperature of the display 5 rises rapidly. Thus, in the present embodiment, the display 5 is dimmed or turned off to suppress a temperature rise of the display 5 due to the external light SL and prevent damage of the display 5 resulting from the external light SL. When receiving a detection signal from the optical sensor 9, the controller 7 may transmit a drive signal to the drive unit 15. In this case, the drive unit 15 is driven according to the drive signal from the controller 7 to change the reflection angle of the concave mirror 13. By changing the reflection angle of the concave mirror 13, the external light SL reflected by the concave mirror 13 is not directed toward the flat mirror 11, and irradiation of the external light SL to the display 5 is eliminated. This can suppress the temperature rise of the display 5 due to the display light L and prevent damage of the display 5 due to overheating.

The vehicle display device 1 described above includes the display 5 that emits a display image projected on the windshield 103 provided outside as the display light L, the reflective mirror 3 that is disposed on the light path of the display light L from the display 5 to the windshield 103 and reflects the display light L, the optical sensor 9 that detects the external light SL entering from the opening 2a communicating between the outside and the internal space 17, and the controller 7 that executes temperature decreasing operation for decreasing the temperature of the display 5 when the optical sensor 9 detects the external light SL. The optical sensor 9 is disposed at a position to which external light SL directed toward the display 5 via the reflective mirror 3 is reflected by the display 5 to be directed. With the above configuration, the external light SL irradiated toward the display 5 via the reflective mirror 3 and reflected from the display 5 is detected, so that the external light SL with which the display 5 is irradiated can be detected accurately. In addition, since the temperature decreasing operation is executed when the optical sensor 9 detects the external light SL, it is possible to suppress the temperature rise of the display 5 due to the external light SL and to prevent damage of the display 5 by overheating.

Further, in the vehicle display device 1, the optical sensor 9 is disposed on an opposite side of the opening 2a via the display 5 in the internal space 17. This makes it possible to suppress direct irradiation of the external light SL entering from the opening 2a to the display 5. Further, for example, the optical sensor 9 is not disposed on the light path from the display 5 to the windshield 103, and interference with the display light L by the optical sensor 9 can be prevented.

In the vehicle display device 1, the display 5 includes the liquid crystal display unit 21 and the backlight unit 22. The backlight unit 22 is disposed facing the flat mirror 11. The liquid crystal display unit 21 is disposed inclined toward the optical sensor 9 with respect to an emission direction of the light emitted from the backlight unit 22 toward the flat mirror 11. With the above configuration, the external light SL with which the liquid crystal display unit 21 is irradiated can be reflected toward the optical sensor 9, and detection accuracy of the external light SL by the optical sensor 9 can be improved.

Modification of First Embodiment

Figure 4:
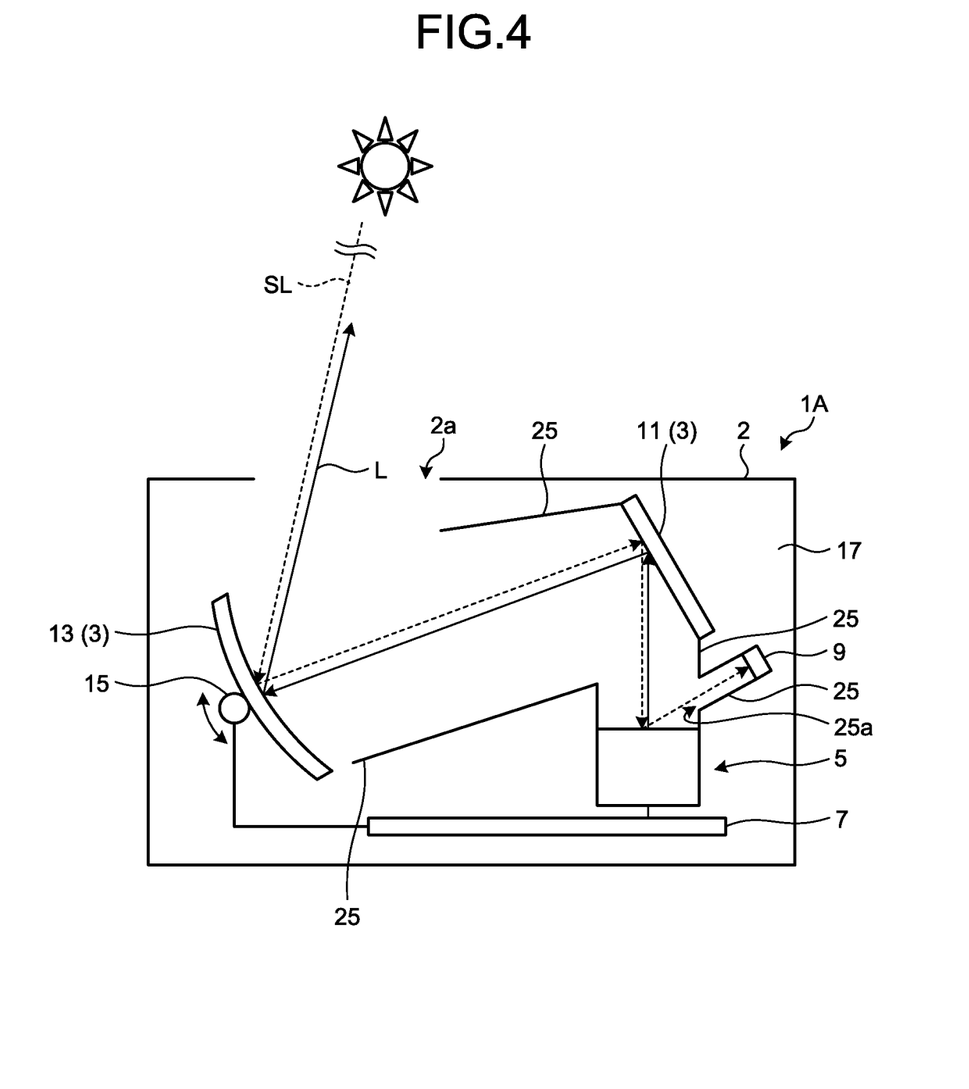
FIG. 4 is a schematic view illustrating a schematic configuration of a vehicle display device according to a modification of the first embodiment.

FIG. 4 is a schematic view illustrating a schematic configuration of a vehicle display device according to a modification of the first embodiment. A vehicle display device 1A according to the modification of the present embodiment is different from the vehicle display device 1 in that an inner housing 25 is provided in the housing 2.

The inner housing 25 is formed of, for example, a synthetic resin material, housed in the internal space 17 of the housing 2, and formed so as to partition the internal space 17. The inner housing 25 is formed mainly to support the optical sensor 9 but may be formed to support the reflective mirror 3, the display 5, and the controller 7. The inner housing 25 is formed to secure a light path of the display light L from the display 5 to the opening 2a of the housing 2. Further, the inner housing 25 is formed to secure a light path of the external light SL from the display 5 to the optical sensor 9. The inner housing 25 has an opening 25a formed between the display 5 and the optical sensor 9. The external light SL reflected from the display 5 passes through the opening 25a toward the optical sensor 9.

The vehicle display device 1A includes the inner housing 25 that is housed in the housing 2 and supports at least the optical sensor 9. The inner housing 25 is formed to secure a light path of display light from the display 5 to the opening 2a of the housing 2 and to secure the light path of the external light SL from the display 5 to the optical sensor 9. As a result, the optical sensor 9 can receive only the external light SL with which the display 5 is irradiated via the reflective mirror 3 and which is reflected from the display 5, and the detection accuracy of the external light SL by the optical sensor 9 can be further improved.

In the first embodiment and the modification thereof, the liquid crystal display unit 21 is disposed, but not limited to, inclined toward the optical sensor 9 with respect to the emission direction of the display light L. For example, the liquid crystal display unit 21 may be disposed facing the backlight unit 22 in the emission direction of the display light L.

In the first embodiment and the modification thereof, when the optical sensor 9 detects the external light SL, the controller 7 controls, but not limited to, the display 5 and the drive unit 15 to execute one of the first temperature decreasing operation and the second temperature decreasing operation. For example, when the optical sensor 9 detects the external light SL, the controller 7 may control the display 5 and the drive unit 15 to simultaneously execute both the first temperature decreasing operation and the second temperature decreasing operation. Further, when the optical sensor 9 detects the external light SL, the controller 7 may gradually control to execute one of the first temperature decreasing operation and the second temperature decreasing operation, followed by execution of the other of the first temperature decreasing operation and the second temperature decreasing operation.

Second Embodiment

Figure 5:
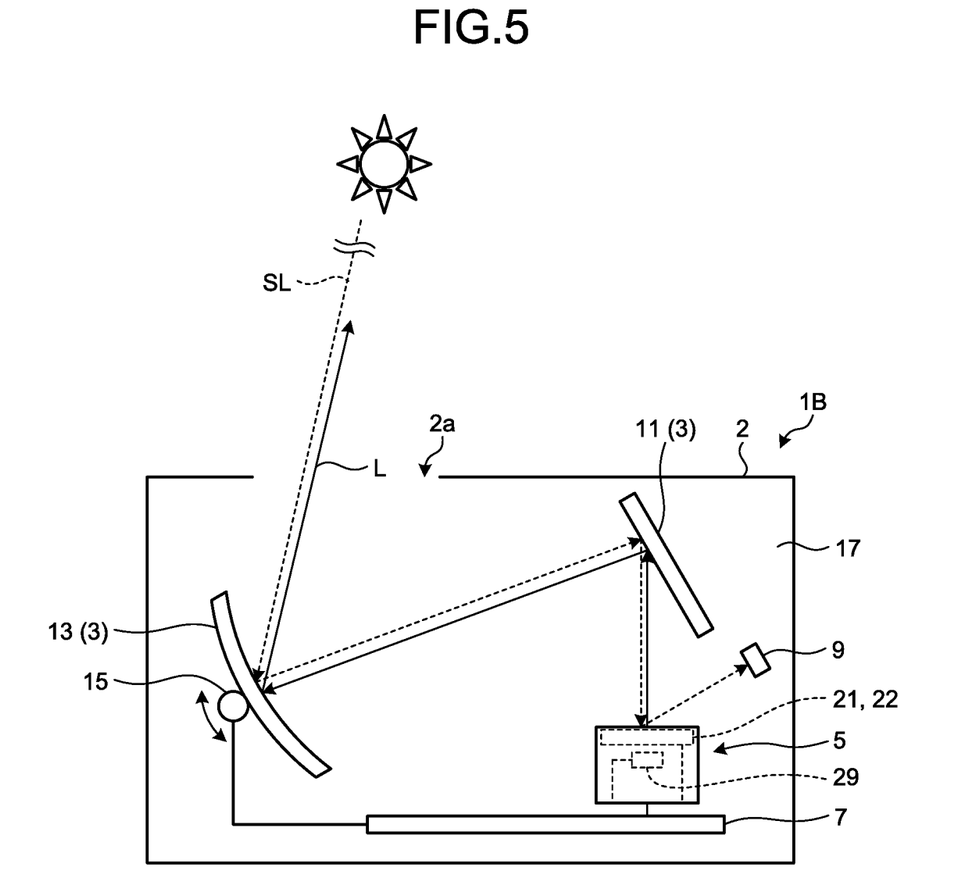
FIG. 5 is a schematic view illustrating a schematic configuration of a vehicle display device according to a second embodiment.
Figure 6:
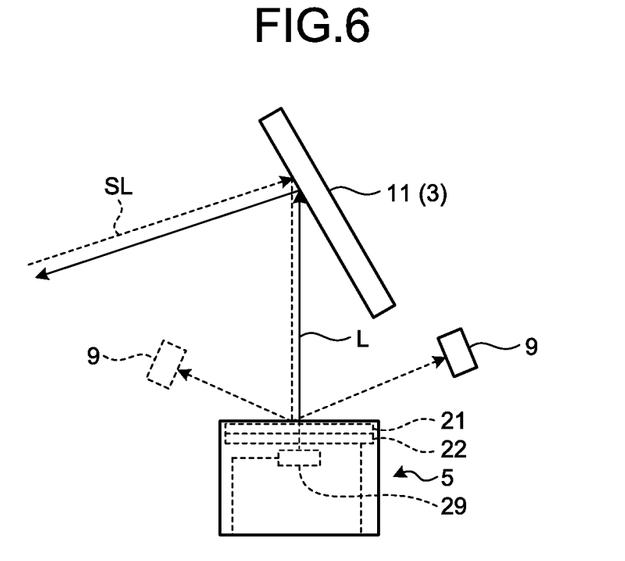
FIG. 6 is a schematic view illustrating a schematic configuration of a display according to the second embodiment.
Figure 7:
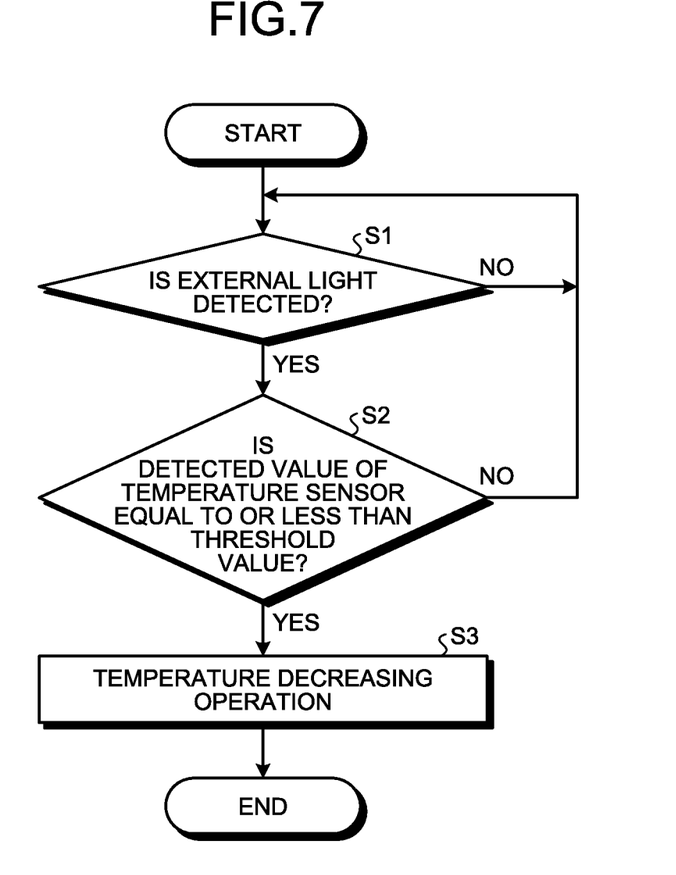
FIG. 7 is a flowchart illustrating an example of control operation of a controller according to the second embodiment.

Next, a vehicle display device according to a second embodiment will be described with reference to FIGS. 5 to 7. FIG. 5 is a schematic view illustrating a schematic configuration of the vehicle display device according to the second embodiment. FIG. 6 is a schematic view illustrating a schematic configuration of a display according to the second embodiment. FIG. 7 is a flowchart illustrating an example of control operation of a controller according to the second embodiment.

A vehicle display device 1B according to the second embodiment differs from the vehicle display device 1 according to the first embodiment in that a temperature sensor 29 is provided inside the display 5 as illustrated in FIGS. 5 and 6. In the following description, components common to those in the first embodiment bear identical signs, and description thereof is omitted or simplified.

The temperature sensor 29 detects the temperature of the display 5 and includes, for example, a thermistor, a thermocouple, a resistance temperature detector (RTD), and an IC temperature sensor. The temperature sensor 29 is disposed in an internal space of the display 5 and is disposed near the liquid crystal display unit 21 or the backlight unit 22. The temperature sensor 29 is electrically connected to the controller 7 and outputs a detected value detected by the temperature sensor 29 to the controller 7. For example, the temperature sensor 29 may output a detected value to the controller 7 at regular intervals or may output a detected value to the controller 7 according to a request from the controller 7.

When a detected value is input from the temperature sensor 29, the controller 7 compares the detected value with a threshold value held in advance. A threshold value is a reference temperature at which the display 5 can emit the display light L with an appropriate luminance. For example, a threshold value is a lower limit temperature in an operating temperature range in which the backlight unit 22 in the display 5 can emit the display light L with an appropriate luminance. This threshold value is, for example, different from a temperature (here, a limit temperature) at which the liquid crystal display unit 21 may be damaged, and a relationship of threshold value <limit temperature is established. The controller 7 determines whether to execute the above-described temperature decreasing operation based on a detection result of the external light SL by the optical sensor 9 and a comparison result between a detected value of the temperature sensor 29 and a threshold value. When the optical sensor 9 detects the external light SL and a detected value of the temperature sensor 29 is equal to or less than a threshold value, the controller 7 of the present embodiment restricts execution of the temperature decreasing operation.

The liquid crystal display unit 21 of the present embodiment is disposed in a direction orthogonal to the emission direction of the display light L emitted from the backlight unit 22 toward the flat mirror 11. In other words, the liquid crystal display unit 21 is disposed facing the display 5 in the emission direction of the display light L. More specifically, the liquid crystal display unit 21 is disposed facing the backlight unit 22 in the emission direction of the display light L.

Next, the temperature decreasing operation in the vehicle display device 1B will be described with reference to FIGS. 5 and 7. The external light SL entering from the opening 2a of the housing 2 is directed toward the liquid crystal display unit 21 via the concave mirror 13 and the flat mirror 11. When the external light SL enters, the liquid crystal display unit 21 reflects and diffuses the external light SL. A part of the diffused reflected light is directed toward the optical sensor 9. When detecting infrared rays based on the received external light SL (YES in step S1), the optical sensor 9 outputs a detection signal to the controller 7. When receiving the detection signal from the optical sensor 9, the controller 7 compares a detected value detected by the temperature sensor 29 with a threshold value (step S2). When the detected value is equal to or less than the threshold value (YES in step S2), the controller 7 restricts execution of the temperature decreasing operation. For example, the controller 7 does not transmit a dimming signal or a turning-off signal to the display 5. On the other hand, when receiving the detection signal from the optical sensor 9 and when the detected value of the temperature sensor 29 exceeds the threshold value (NO in step S2), the controller 7 executes one of the first temperature decreasing operation and the second temperature decreasing operation (step S3). For example, the controller 7 transmits a dimming signal or a turning-off signal to the display 5. The display 5 dims the backlight unit 22 when receiving a dimming signal from the controller 7 but turns off the backlight unit 22 when receiving a turning-off signal from the controller 7.

When the optical sensor 9 detects the external light SL, the controller 7 executes the temperature decreasing operation of the display 5. However, when the temperature decreasing operation of the display 5, for example, dimming or turning off the display 5, is executed in a low temperature environment where luminance during lighting decreases, even if the temperature of the liquid crystal display unit 21 rises due to the irradiation of the external light SL, the display 5 is unlikely to be damaged immediately. When the display 5 is dimmed or turned off even at a temperature that does not cause a damage to the display 5, sufficient luminance may not be obtained, and display quality may be degraded. Therefore, in the second embodiment, when the optical sensor 9 detects the external light SL and a detected value by the temperature sensor 29 is equal to or less than a threshold value, the controller 7 restricts dimming or turning-off of the display 5. More specifically, when the optical sensor 9 detects the external light SL and the detected value by the temperature sensor 29 is equal to or less than a threshold value, the controller 7 controls each unit so as not to execute the temperature decreasing operation.

The vehicle display device 1B described above further includes the temperature sensor 29 that detects the temperature of the display 5. When the optical sensor 9 detects the external light SL and a detected value by the temperature sensor 29 is equal to or less than a threshold value, the controller 7 restricts execution of the temperature decreasing operation. Consequently, in addition to the effects of the first embodiment, for example, in a low temperature environment where luminance during lighting decreases, the temperature decreasing operation is restricted even when the external light SL enters. Therefore, degradation of display quality can be suppressed.

In the second embodiment, the optical sensor 9 is disposed on, but not limited to, the opposite side of the opening 2a via the display 5 in the internal space 17. The optical sensor 9 is disposed in the internal space 17 of the housing 2 in a range where reflected light diffused (diffusion reflected light) by the external light SL striking the liquid crystal display unit 21 reaches. For example, as illustrated in FIG. 6, the optical sensor 9 is disposed on a side of the opening 2a with respect to the liquid crystal display unit 21. Thus, the optical sensor 9 can be disposed in the internal space 17 of the housing 2 in a range where reflected light diffused by the external light SL striking the liquid crystal display unit 21 reaches. Therefore, it is possible to ensure flexibility in layout of the optical sensor 9 and contribute to downsizing of the housing 2. Reflected light of the present embodiment includes diffused light and regular reflected light. Further, diffused light of the present embodiment is a component different from regular reflected light when light strikes an object (for example, the liquid crystal display unit 21).

Modification of Second Embodiment

Figure 8:
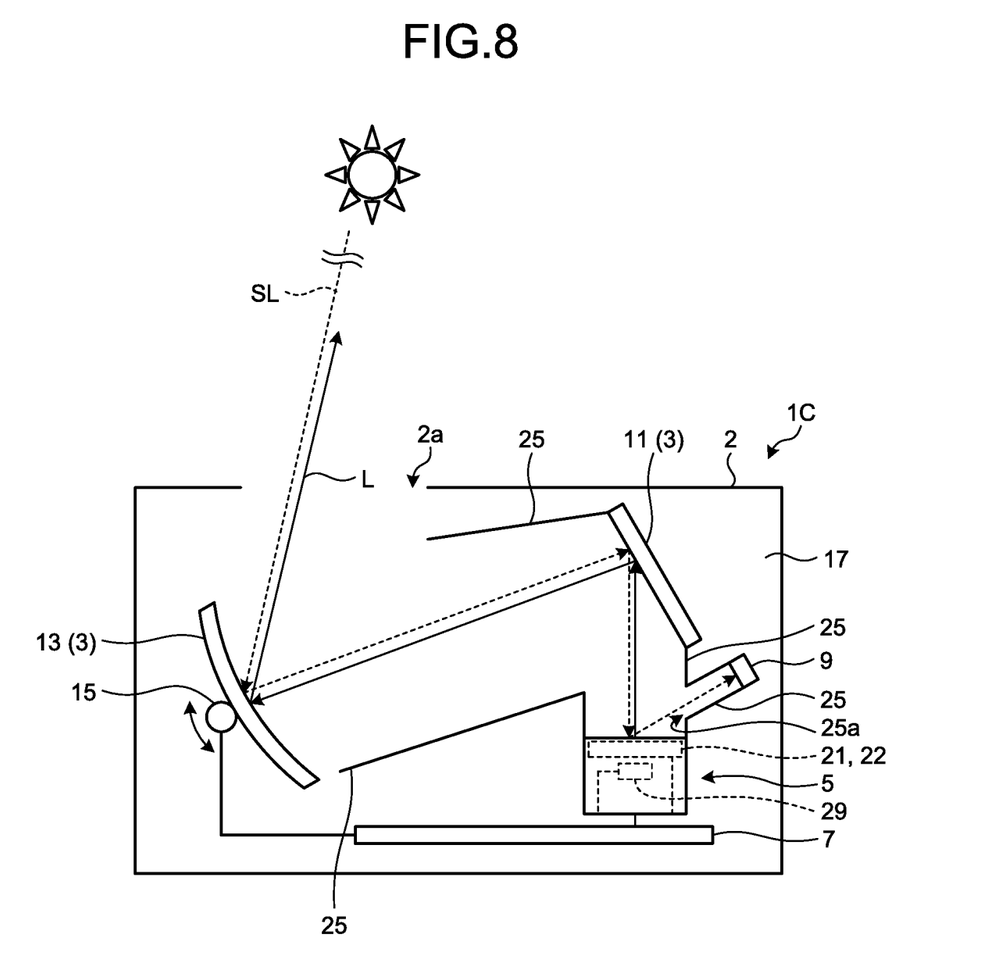
FIG. 8 is a schematic view illustrating a schematic configuration of a vehicle display device according to a modification of the second embodiment.

FIG. 8 is a schematic view illustrating a schematic configuration of the vehicle display device according to a modification of the second embodiment. A vehicle display device 1C according to the modification of the second embodiment differs from the vehicle display device 1B in that the above-described inner housing 25 is included in the housing 2.

The vehicle display device 1C includes the inner housing 25 that is housed in the housing 2 and supports at least the optical sensor 9 and the display 5. The inner housing 25 is formed to secure a light path of display light from the display 5 to the windshield 103 and to secure the light path of the external light SL from the display 5 to the optical sensor 9. As a result, for example, the optical sensor 9 can receive only the external light SL, and the detection accuracy of the external light SL by the optical sensor 9 can be further improved.

In the second embodiment and the modification thereof, the temperature sensor 29 is disposed, but not limited to, inside the display 5 and may be disposed inside the vehicle display devices 1B and 1C (inside the housing 2) and outside the display 5. For example, the temperature sensor 29 may be disposed around the display 5 and disposed on a substrate that functions as the controller 7. In addition, as illustrated in FIG. 9, the temperature sensor 29 may be disposed in the vehicle and outside the vehicle display devices 1B and 1C (outside the housing 2). For example, the temperature sensor 29 is disposed inside the instrument panel 102 in the vehicle (solid line in FIG. 9). Further, the temperature sensor 29 may be disposed outside the vehicle and outside the vehicle display devices 1B and 1C. For example, the temperature sensor 29 is disposed under a floor panel outside the vehicle (dotted line in FIG. 9).

When obtaining a detected value from the temperature sensor 29 disposed inside the vehicle and outside the housing 2, the controller 7 in the modification compares a threshold value (a second threshold value corresponding to a temperature in the vehicle) different from the above-described threshold value (a first threshold value corresponding to a temperature inside the display 5) with the detected value. The second threshold value is an estimated temperature in the vehicle when the backlight unit 22 can emit the display light L with an appropriate luminance. In addition, when obtaining a detected value from the temperature sensor 29 disposed outside the vehicle and outside the housing 2, the controller 7 compares a threshold value (a third threshold value corresponding to a temperature outside the vehicle) different from the first and the second threshold values with the detected value. The third threshold value is an estimated temperature outside the vehicle when the backlight unit 22 can emit the display light L with an appropriate luminance. Thus, the controller 7 uses different threshold values to compare with a detected value according to a disposed position of the temperature sensor 29.

The vehicle display devices 1B and 1C in the modifications described above further include a temperature sensor disposed at least in the vehicle and outside the vehicle display devices 1B and 1C. When the optical sensor 9 detects the external light SL and a detected value by the temperature sensor 29 is equal to or less than a threshold value (the second or the third threshold value), the controller 7 restricts execution of the temperature decreasing operation. Consequently, in addition to the effects of the first embodiment, for example, when the vehicle 100 is placed in a low temperature environment, the temperature decreasing operation is restricted even when the external light SL enters. Therefore, degradation of display quality can be suppressed. Further, since the temperature sensor 29 is not disposed inside the vehicle display devices 1B and 1C, it is possible to ensure flexibility in layout of the temperature sensor 29 and contribute to downsizing of the housing 2.

In the second embodiment and the modification thereof, when the optical sensor 9 detects the external light SL and a detected value by the temperature sensor 29 exceeds a threshold value (a first threshold value, a second threshold value, or a third threshold value), the controller 7 controls, but not limited to, the display 5 and the drive unit 15 to execute one of the first temperature decreasing operation and the second temperature decreasing operation. For example, when the optical sensor 9 detects the external light SL and a detected value by the temperature sensor 29 exceeds a threshold value, the controller 7 may control the display 5 and the drive unit 15 to simultaneously execute both the first temperature decreasing operation and the second temperature decreasing operation. Further, when the optical sensor 9 detects the external light SL and a detected value by the temperature sensor 29 exceeds a threshold value, the controller 7 may gradually control to execute one of the first temperature decreasing operation and the second temperature decreasing operation, followed by execution of both the first temperature decreasing operation and the second temperature decreasing operation.

Further, a plurality of temperature sensors 29 may be disposed at different places with respect to the vehicle 100. For example, the temperature sensor 29 may be disposed inside the display 5 and may be disposed inside and outside the vehicle 100. In this case, since different detected values are output from the temperature sensors 29, respectively, the controller 7 may restrict execution of the temperature decreasing operation by selecting one detected value from among the detected values based on certain conditions and comparing the selected value with a threshold value corresponding to the temperature sensor 29 that outputs the one detected value. This temperature decreasing operation includes both the first temperature decreasing operation and the second temperature decreasing operation.

Moreover, in the second embodiment and the modification thereof, the liquid crystal display unit 21 is disposed, but not limited to, facing the display 5 in the emission direction of the display light L. For example, the liquid crystal display unit 21 may be disposed inclined toward the optical sensor 9 with respect to the emission direction of the display light L.

In the first and second embodiments and the modifications thereof, the vehicle display devices 1, 1A, 1B, and 1C have, but not limited to, two reflective mirrors 3 and may have one reflective mirror 3 or may have three or more reflective mirrors 3. The flat mirror 11 may be a concave mirror, or may be, for example, a convex mirror, an aspheric mirror, a spherical mirror, or a free-form mirror. The concave mirror 13 may be, for example, a convex mirror, an aspheric mirror, a spherical mirror, or a free-form mirror.

In the first and the second embodiments and the modifications thereof, the concave mirror 13 has a function as, but not limited to, a magnifying mirror and may have a function as a correction mirror.

In the first and the second embodiments and the modifications thereof, the concave mirror 13 is supported by, but not limited to, the drive unit 15 rotatably and may be supported by the housing 2 or the inner housing 25 immovably. The flat mirror 11 is immovably supported by the housing 2 or the inner housing 25 but may be, as with the concave mirror 13, rotatably supported by a drive unit.

Further, the display 5 and the reflective mirror 3 in the first and the second embodiments and the modifications thereof are not limited to positions as illustrated.

In the first and the second embodiments and the modifications thereof, the opening 2a may be closed by a transparent cover that transmits the display light L. A transparent cover prevents entry of, for example, dust into the housing 2 from outside by closing the opening 2a.

In the first and the second embodiments and the modifications thereof, the display 5 is a liquid crystal type but may be other types such as a laser type, a digital light processing (DLP) type, and a projector type.

In the first and the second embodiments and the modifications thereof, in the internal space 17 of the housing 2, one optical sensor 9 is disposed, but not limited to one optical sensor 9, a plurality of optical sensors 9 may be disposed. In this case, as long as the position is a position where the external light SL reflected from the display 5 enters, the optical sensors 9 may be disposed at one position or may be disposed at positions different from one another.

In the first and second embodiments and the modifications thereof, the optical sensor 9 is an infrared ray sensor but may be, for example, an illuminance sensor as long as the external light SL can be detected. When the optical sensor 9 is an illuminance sensor, the optical sensor 9 receives light (visible light) in a visible region of the external light SL, converts the light into an electric signal, and outputs the electric signal to the controller 7. In addition, one of an infrared ray sensor and an illuminance sensor may be disposed in the optical sensor 9, or both the infrared ray sensor and the illuminance sensor may be disposed.

In the first and the second embodiments and the modifications thereof, the temperature sensor 29 outputs a detected value, but not limited to, directly to the controller 7. For example, the temperature sensor 29 may output a detected value to the controller 7 via the meter 104 or the ECU 105.

In the first and the second embodiments and the modifications thereof, the vehicle display devices 1, 1A, 1B, and 1C project a display image on, but not limited to, the windshield 103 of the vehicle 100 and may project a display image on a combiner, for example.

In the embodiment, the vehicle display devices 1 and 1A are applied to, but not limited to, the vehicle 100 such as an automobile, for example, and may be applied to, for example, ships or aircrafts other than the vehicle 100.

A vehicle display device according to the present embodiments and the modifications thereof can advantageously detect accurately external light with which a display is irradiated via a reflective mirror and prevent damage of the display due to external light.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   a display that is housed in an internal space of a housing, the housing having an opening communicating between an outside of the housing and the internal space, and that emits, as display light, a display image projected on a projection target provided the outside of the housing;
   at least one reflective mirror that is disposed on a light path of the display light from the display to the projection target and reflects the display light;
   at least one optical sensor that is disposed at a position to which an external light entering from the opening and directed toward the display via the reflective mirror is reflected by the display to be directed toward the at least one optical sensor directly; and a controller configured to execute temperature decreasing operation for decreasing a temperature of the display by detecting a light by the optical sensor.

2. The vehicle display device according to claim 1, wherein the optical sensor is disposed on an opposite side of the opening via the display in the internal space.

3. The vehicle display device according to claim 2, further comprising:

a temperature sensor that detects a temperature of the display, wherein the controller restricts execution of the temperature decreasing operation when the optical sensor detects the light and a detected value by the temperature sensor is equal to or less than a threshold value.

4. The vehicle display device according to claim 3, wherein the display includes:

a transmissive liquid crystal display unit; and a backlight unit that illuminates the liquid crystal display unit from a back side, the backlight unit is disposed facing the reflective mirror, and the liquid crystal display unit is disposed inclined toward the optical sensor with respect to an emission direction of light emitted from the backlight unit toward the reflective mirror.

5. The vehicle display device according to claim 2, further comprising:

a temperature sensor that is disposed at least in a vehicle and the outside of the housing, wherein the controller restricts execution of the temperature decreasing operation when the optical sensor detects the light and a detected value by the temperature sensor is equal to or less than a threshold value.

6. The vehicle display device according to claim 5, wherein the display includes:

a transmissive liquid crystal display unit; and a backlight unit that illuminates the liquid crystal display unit from a back side, the backlight unit is disposed facing the reflective mirror, and the liquid crystal display unit is disposed inclined toward the optical sensor with respect to an emission direction of light emitted from the backlight unit toward the reflective mirror.

7. The vehicle display device according to claim 2, wherein the display includes:

a transmissive liquid crystal display unit; and a backlight unit that illuminates the liquid crystal display unit from a back side, the backlight unit is disposed facing the reflective mirror, and the liquid crystal display unit is disposed inclined toward the optical sensor with respect to an emission direction of light emitted from the backlight unit toward the reflective mirror.

8. The vehicle display device according to claim 1, further comprising:

a temperature sensor that detects a temperature of the display, wherein the controller restricts execution of the temperature decreasing operation when the optical sensor detects the light and a detected value by the temperature sensor is equal to or less than a threshold value.

9. The vehicle display device according to claim 8, wherein the display includes:

a transmissive liquid crystal display unit; and a backlight unit that illuminates the liquid crystal display unit from a back side, the backlight unit is disposed facing the reflective mirror, and the liquid crystal display unit is disposed inclined toward the optical sensor with respect to an emission direction of light emitted from the backlight unit toward the reflective mirror.

10. The vehicle display device according to claim 1, further comprising:

a temperature sensor that is disposed at least in a vehicle and the outside of the housing, wherein the controller restricts execution of the temperature decreasing operation when the optical sensor detects the light and a detected value by the temperature sensor is equal to or less than a threshold value.

11. The vehicle display device according to claim 10, wherein the display includes:

a transmissive liquid crystal display unit; and a backlight unit that illuminates the liquid crystal display unit from a back side, the backlight unit is disposed facing the reflective mirror, and the liquid crystal display unit is disposed inclined toward the optical sensor with respect to an emission direction of light emitted from the backlight unit toward the reflective mirror.

12. The vehicle display device according to claim 1, wherein the display includes:

a transmissive liquid crystal display unit; and a backlight unit that illuminates the liquid crystal display unit from a back side, the backlight unit is disposed facing the reflective mirror, and the liquid crystal display unit is disposed inclined toward the optical sensor with respect to an emission direction of light emitted from the backlight unit toward the reflective mirror.

* * * * *